(12) United States Patent
Hori et al.

(10) Patent No.: US 6,698,678 B2
(45) Date of Patent: *Mar. 2, 2004

(54) WEBBING RETRACTOR AND METHOD OF RETRACTING WEBBING

(75) Inventors: Seiji Hori, Aichi-ken (JP); Tomonori Nagata, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/190,623

(22) Filed: Jul. 9, 2002

(65) Prior Publication Data
US 2003/0029954 A1 Feb. 13, 2003

(30) Foreign Application Priority Data
Jul. 11, 2001 (JP) ........................................ 2001-211094

(51) Int. Cl.⁷ .............................................. B60R 22/28
(52) U.S. Cl. ..................... 242/383; 242/379.1; 280/806; 280/805; 297/478
(58) Field of Search ............................. 242/379.1, 383; 280/806, 805; 297/478

(56) References Cited

U.S. PATENT DOCUMENTS

| | | | |
|---|---|---|---|
| 5,788,177 A | * 8/1998 | Keller et al. | 242/379.1 |
| 5,924,641 A | * 7/1999 | Keller et al. | 242/379.1 |
| 5,967,442 A | * 10/1999 | Wier | 242/379.1 |
| 5,975,451 A | * 11/1999 | Kawamoto | 242/379.1 |
| 6,042,042 A | * 3/2000 | Fujii et al. | 242/379.1 |
| 6,131,843 A | * 10/2000 | Singer et al. | 242/379.1 |
| 6,216,972 B1 | 4/2001 | Rohrle | |
| 6,302,346 B1 | * 10/2001 | Brown et al. | 242/379.1 |
| 6,481,660 B2 | * 11/2002 | Nagata et al. | 242/379.1 |
| 6,497,379 B2 | * 12/2002 | Yano et al. | 242/379.1 |

FOREIGN PATENT DOCUMENTS

JP   2001-334911   12/2001

* cited by examiner

*Primary Examiner*—Donald P. Walsh
*Assistant Examiner*—Jonathan R Miller
(74) *Attorney, Agent, or Firm*—Nixon Peabody, LLP

(57) ABSTRACT

In a webbing retractor, a wire is inserted through a through-hole of a spool on which a webbing is taken-up and from which the webbing is pulled-out. At an initial stage of a process of absorbing inertial energy of a vehicle occupant, a large force limiter load is generated by adding a rubbing force of the wire at a peripheral portion of the through-hole, to a twisting load of a torsion bar. An energy absorption amount is made large, and an amount of pulling-out of the webbing is kept low. After a predetermined amount of energy has been absorbed, when the wire is completely pulled-out from the through-hole, the rubbing force of the wire is cancelled, the force limiter load is reduced, and force applied to the vehicle occupant via the webbing is reduced.

18 Claims, 9 Drawing Sheets

F I G. 1
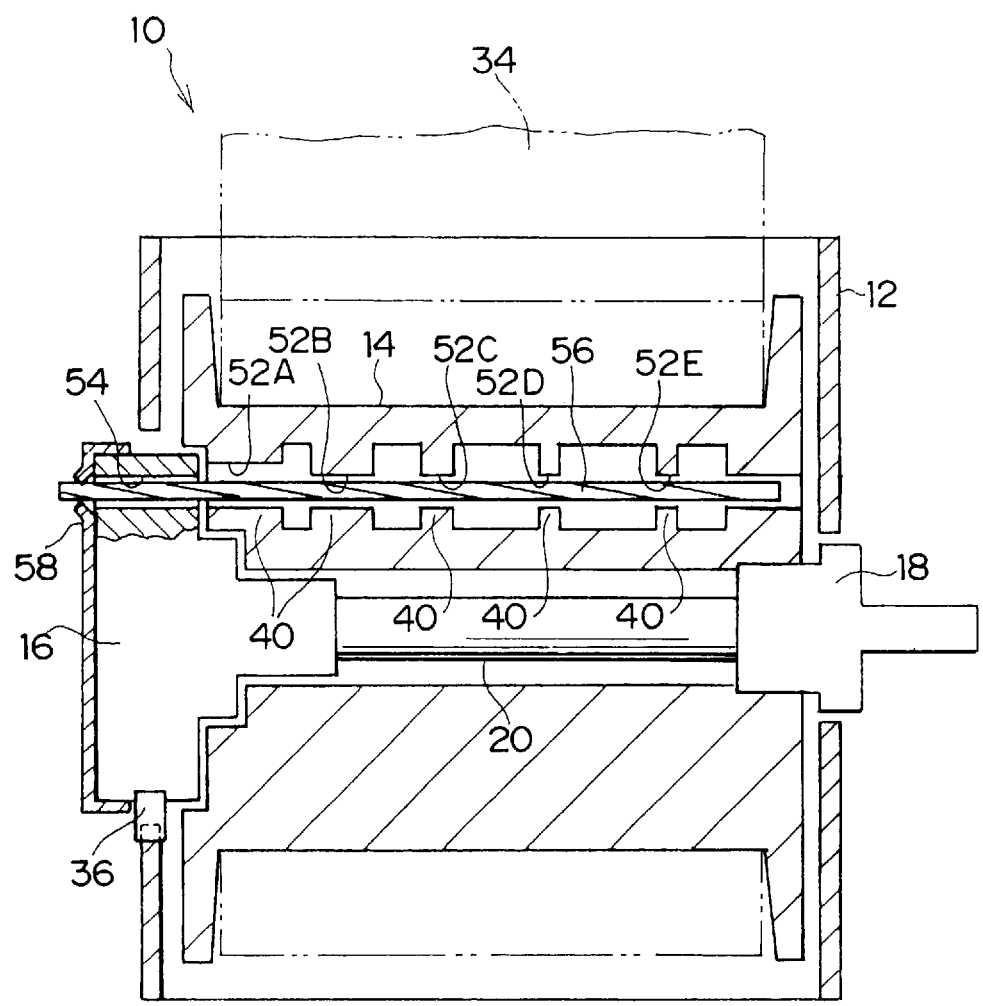

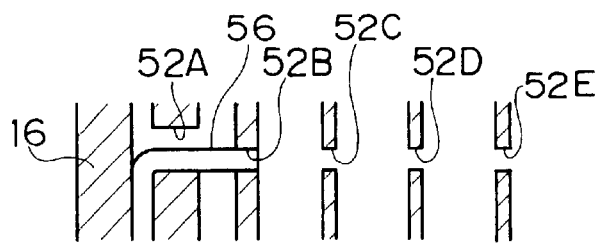
F I G. 3 A
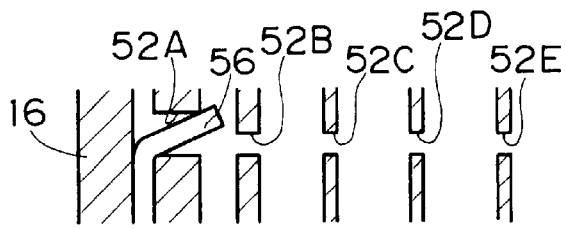
F I G. 3 B
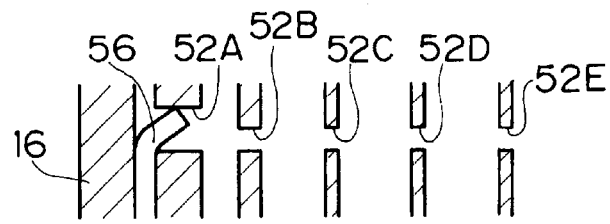
F I G. 3 C
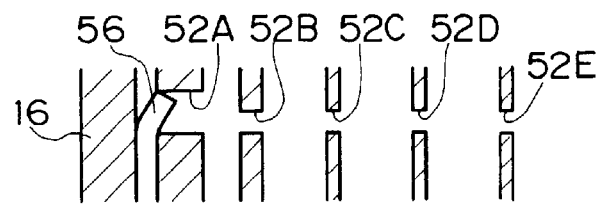
F I G. 3 D

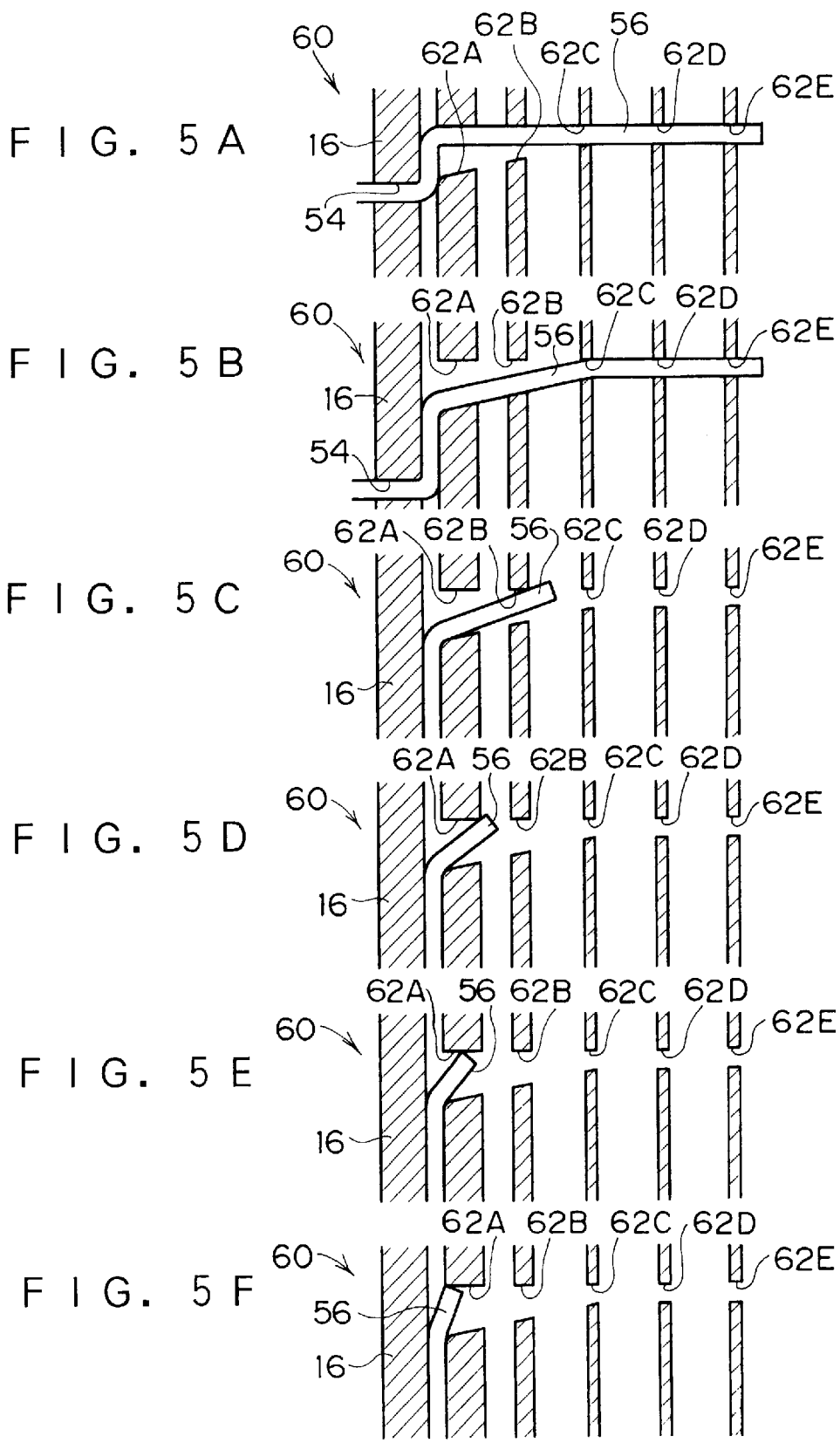

WEBBING RETRACTOR AND METHOD OF RETRACTING WEBBING

BACKGROUND OF THE INVENTION

1. Field of the Invention

The present invention relates to a webbing retractor. In particular, the present invention relates to a webbing retractor which, when pulling-out of a webbing is to be impeded, allows the webbing to be pulled out to a certain extent such that energy of an inertial force can be absorbed.

2. Description of the Related Art

In a webbing retractor, when the vehicle rapidly decelerates, rotation of a spool (a take-up shaft) in a direction of pulling-out a webbing is locked, such that pulling-out of the webbing is impeded. An example of the lock mechanism is a structure in which a lock device is disposed in a vicinity of a device frame at one end side of the spool. Due to the lock device operating when the vehicle rapidly decelerates, rotation of the spool in the webbing pull-out direction is impeded.

Further, in such a webbing retractor, at the time when pulling-out of the webbing is to be impeded, pulling-out of a predetermined amount of the webbing is allowed so as to absorb the energy of the inertial force of the vehicle occupant. An example of such an energy absorbing mechanism is a structure provided with, for example, a spool and a torsion bar which is coaxial with the spool. Generally, the torsion bar is connected to a shaft sensor, whose one end portion is connected to the spool and whose other end portion is connected to a lock device, such that the torsion bar, the shaft sensor, and the spool do not rotate relative to one another. Usually, the spool and the shaft sensor rotate integrally via the torsion bar. However, in a state in which rotation of the shaft sensor in the webbing pull-out direction is impeded when the vehicle rapidly decelerates, the spool rotates in the webbing pull-out direction with respect to the shaft sensor, due to the tensile force of the webbing. At this time, the torsion bar is twisted, the energy applied to the webbing is absorbed, and a predetermined amount of rotation of the spool is permitted. The absorbed energy is determined by the product of the load applied to the webbing (the force limiter load) and the webbing pull-out amount (the amount of rotation of the spool). In the webbing retractor, the force limiter load and the allowable amount of rotation of the spool (the twisting limit of the torsion bar) are given.

However, in such a conventional webbing retractor, the force limiter load at the time of energy absorption is a value which is determined exclusively by the values of the properties of the material of the torsion bar, and the dimensions and configuration of the torsion bar and the like. Only a value which is constant from the start of operation to the end thereof has been able to be used as the value of the force limiter load at the time of energy absorption.

SUMMARY OF THE INVENTION

In view of the aforementioned, an object of the present invention is to provide a webbing retractor in which, with a simple structure, a force limiter load can be changed at a predetermined timing, and the inertial energy of a vehicle occupant can be absorbed better.

The webbing retractor of the present invention comprises: a spool which is tubular and onto which a webbing is taken-up and from which a webbing is pulled-out; a shaft sensor provided at one end side of the spool, coaxially with the spool and so as to be able to rotate relative to the spool; a lock device connected to the shaft sensor, and when a predetermined acceleration is sensed, the lock device engages with a frame so as to impede rotation of the shaft sensor in a webbing pull-out direction; a torsion bar provided within the spool and coaxially with the spool, and one end of the torsion bar is connected to the spool and another end of the torsion bar is connected to the shaft sensor, and the torsion bar is usually rotated integrally with the shaft sensor, and in a state in which rotation of the shaft sensor in the webbing pull-out direction is impeded by the lock device, the torsion bar rotates the spool in the webbing pull-out direction relative to the shaft sensor, while being twisted due to a webbing tensile force; and a wire spanning between the shaft sensor and the spool and inserted movably within the spool, and in the state in which rotation of the shaft sensor in the webbing pull-out direction is impeded by the lock device, as the spool rotates until relative rotation of the spool with respect to the shaft sensor has reached a predetermined amount, the wire is rubbed at exit portion of the spool and imparts a rubbing force which offers resistance to the relative rotation, wherein the webbing retractor includes a force limiting device which, when pulling-out of the wire from the spool is being completed while the wire is being rubbed, limits the rubbing force at the time the pulling-out of the wire is being completed such that the rubbing force does not exceed rubbing force therebefore.

The wire encompasses, for example, rod-shaped members which do not easily deform, i.e., do not deform due to their own weight or by human force.

In the webbing retractor of the present invention, the spool and the shaft sensor are connected via the torsion bar. Usually, the spool, the shaft sensor and the torsion bar rotate integrally, and the webbing can be freely taken-up or pulled-out.

Here, when a predetermined acceleration (or deceleration) is sensed at the time when the vehicle rapidly decelerates such as, for example, the time of a vehicle collision or the like, the lock device operates such that rotation of the shaft sensor in the webbing pull-out direction is impeded. At this time, the webbing tensile force acts as torque, in the webbing pull-out direction, on the torsion bar via the spool. Thus, the torsion bar is twisted, and while the load applied to (the vehicle occupant via) the webbing is maintained constant (i.e., while a constant force limiter load is applied), the spool is rotated with respect to the shaft sensor in the webbing pull-out direction, and the webbing is pulled-out. The absorption of energy by the torsion bar is achieved.

When the torsion bar is twisted and the spool rotates relatively with respect to the shaft sensor, as the spool rotates, the wire is rubbed at the exit portion of the spool, and while being taken-up onto the side surface of the spool, imparts a load which offers resistance to this relative rotation, during the period of time until the relative rotation of the spool reaches a predetermined amount. Accordingly, in addition to the twisting load of the torsion bar, the rubbing force of the wire is applied to (the vehicle occupant via) the webbing as force limiter load. Namely, a force limiter load, which is greater than the force limiter load obtained only by the twisting load of the torsion bar, is obtained. The webbing pull-out speed (i.e., the rotational speed of the spool) can be kept low, and appropriate energy absorption can be achieved.

Further, when the spool rotates by a predetermined amount with respect to the shaft sensor, the entire wire, which spans between the shaft sensor and the spool, is pulled-out completely from the spool (i.e., the entire length of the wire is taken-up), and the imparting of load due to the rubbing of the wire is cancelled. Thus, only the twisting load of the torsion bar is applied to (the vehicle occupant via) the webbing as force limiter load. Namely, the force limiter load becomes lower than the initial force limiter load at the time when the energy absorption started.

In this way, in the webbing retractor of the present invention, the force limiter load can be changed at a predetermined timing. Namely, in the initial stages of rapid deceleration of a vehicle, the rubbing force due to the wire is added such that the energy absorption amount per unit time becomes large, and the pulled-out amount of the webbing (the amount of movement of the vehicle occupant) is suppressed. After a predetermined absorption of energy, by decreasing the energy absorption amount per unit time, the load applied to the vehicle occupant can be decreased. This is a desirable characteristic for the webbing retractor. In particular, in vehicles which are equipped with an air bag device, by reducing the force limiter load immediately before the air bag and the vehicle occupant contact, it is possible to reduce the load applied to the vehicle occupant, and injury to the vehicle occupant can be reduced further. Moreover, even in vehicles which are not equipped with an air bag device, by reducing the force limiter load immediately before the vehicle occupant and a portion within the vehicle, such as a steering wheel, an instrument panel (a dashboard), or the like, contact, it is possible to reduce the load applied to the vehicle occupant. This characteristic leads to a reduction in injury to the vehicle occupant.

Here, the webbing retractor of the present invention is provided with a force limiting device which limits the rubbing force, at the time when the wire is being rubbed while pulling-out of the wire from the spool is being completed, such that this rubbing force in the stages of completion of pulling-out does not exceed the rubbing force there before. Thus, the rubbing force which is imparted due to the rubbing of the wire does not suddenly increase at the time when the wire is completely pulled out from the spool. In other words, no large pull-out load of the wire arises. Accordingly, the force limiter load can be smoothly changed from a large value in the initial stages to a small value in the latter stages. In other words, the state is changed from a state in which the energy absorption amount per unit time is large to a state in which the energy absorption amount per unit time is small.

As described above, in the webbing retractor relating to the present invention, with a simple structure, the force limiter load can be changed at a predetermined timing, and the inertial energy of the vehicle occupant can be absorbed better.

In the webbing retractor of the present invention, usually, the force limiting device is a through-hole which is provided in the spool and in which the wire is movably inserted, the through-hole being formed such that a spool exit portion side of the through-hole has an enlarged diameter.

In the webbing retractor of the present invention, usually, the wire is inserted through the through-hole, and pulling-out of the wire from the spool is completed while the wire is being rubbed by the spool exit portion side of the through-hole (the peripheral portion of the through-hole). At this time, the spool exit portion side of the through-hole is formed to have an enlarged diameter. Thus, when pulling-out, from the through-hole, of the distal end portion of the wire, which is bent while being rubbed by (the peripheral portion of) the through-hole, is being completed (i.e., due to the distal end portion of the wire reaching the enlarged diameter portion of the through-hole), the radius of curvature of the distal end portion increases. Accordingly, the rubbing force imparted due to the rubbing of the wire does not increase suddenly at the time when the pulling-out of the wire from the spool is completed. In other words, no large pull-out load of the wire arises. Accordingly, the force limiter load can be smoothly changed from a large value in the initial stages to a small value in the latter stages. In other words, the state can be changed from a state in which the energy absorption amount per unit time is large to a state in which the energy absorption amount per unit time is small.

In the webbing retractor of the present invention, usually, the force limiting device is a taper portion provided at a wire distal end portion and formed so as to taper gradually.

Namely, in the webbing retractor of the present invention, usually, a taper portion, which serves as the force limiting device and which is formed so as to gradually taper, is provided at the distal end portion of the wire. Thus, at the time when the pulling-out of the taper portion of the wire, which is being pulled out from the spool while being rubbed, is being completed (i.e., due to the taper portion reaching the position of rubbing), the rubbing force decreases. Namely, the rubbing force does not suddenly increase when the pulling-out of the wire from the spool is completed. In other words, no large pull-out load of the wire arises. Accordingly, the force limiter load can be smoothly changed from a large value in the initial stages to a small value in the latter stages.

In the webbing retractor of the present invention, usually, the force limiting device is a heat-treated portion provided at a wire distal end portion, the heat-treated portion having a different rubbing force characteristic than other portions of the wire due to the heat-treated portion having been subjected to a heat treatment.

Namely, usually, in the webbing retractor of the present invention, a heat-treated portion, which serves as the force limiting device and whose rubbing force characteristic is different from that of the other portions due to having been heat-treated, is provided at the distal end portion of the wire. Thus, at the time when the pulling-out of the heat-treated portion of the wire, which is pulled out from the spool while being rubbed, is being completed (i.e., due to the heat-treated portion reaching the position of rubbing), the rubbing force decreases. Namely, the rubbing force does not suddenly increase when the pulling-out of the wire from the spool is completed. In other words, no large pull-out load of the wire arises. Accordingly, the force limiter load can be smoothly changed from a large value in the initial stages to a small value in the latter stages.

The webbing retractor of the present invention usually further comprises a delaying device which offsets, in time, a peak of an imparted load at a time when imparting of the rubbing force by the wire starts, with respect to a peak of a twisting load at a time when the torsion bar is twisted.

Namely, usually, in the webbing retractor of the present invention, the peak of the imparted load at the time when imparting of the rubbing force due to the wire starts, is offset, in time, with respect to the peak of the twisting load at the time the torsion bar is twisted. Namely, the peak of the rubbing force imparted by the wire, and the peak of the twisting load imparted by the torsion bar, arise so as to be offset from one another. The peak of the twisting load due to the torsion bar and the peak of the rubbing force due to the wire do not arise so as to be superposed on one another at a same time.

Accordingly, when the lock device operates and rotation of the shaft sensor in the webbing pull-out direction is impeded and the torsion bar is twisted (the force limiter load is applied) and the spool begins to rotate in the webbing pull-out direction with respect to the shaft sensor, the force limiter load (the twisting load due to the torsion bar and the rubbing force due to the wire) does not suddenly increase (no load having a large peak arises). It is possible to make the force limiter load smoothly rise to a predetermined value, and to apply the force limiter load.

In the webbing retractor of the present invention, usually, the delaying device is a through-hole provided in the spool and in which the wire is movably inserted, the through-hole being formed such that a diameter of a spool exit portion side of the through-hole increases at least toward an inner side of curvature of rubbing of the wire.

Namely, in the webbing retractor of the present invention, usually, the wire is inserted through the through-hole, and the pulling-out of the wire from the spool is completed while the wire is being rubbed by the spool exit portion side of the through-hole (the peripheral portion of the through-hole). Here, the diameter of the spool exit portion side of the through-hole is formed to be enlarged at least toward the inner side of the curvature of the rubbing. Thus, at the point in time when the wire is first rubbed (pulled) by (the peripheral portion of) the through-hole, hardly any rubbing force arises at the portion at which the through-hole is formed to have a larger diameter (during the time until the peripheral portion of the through-hole is reached). Namely, at the point in time when the wire is initially rubbed (pulled), rubbing force is first generated when the wire reaches the peripheral portion of the through-hole after having moved through the enlarged diameter portion of the through-hole. In this way, as a result, the peak of the imparted load at the time when imparting of the rubbing force due to the wire is started, is offset in time with respect to the peak of the twisting load at the time when the torsion bar is twisted. Namely, a peak of the rubbing force imparted by the wire, and a peak of the twisting load imparted by the torsion bar, arise so as to be offset from one another. The peak of the twisting load due to the torsion bar and the peak of the rubbing force due to the wire do not arise so as to be superposed on one another at a same time.

Accordingly, when the torsion bar is twisted (the force limiter load is applied) and the spool begins to be rotated in the webbing pull-out direction with respect to the shaft sensor, the force limiter load (the twisting load due to the torsion bar and the rubbing force due to the wire) does not suddenly increase (no load having a large peak arises). It is possible to make the force limiter load smoothly rise to a predetermined value, and to apply the force limiter load.

BRIEF DESCRIPTION OF THE DRAWINGS

FIG. 1 is a cross-sectional view showing the overall structure of a webbing retractor relating to a first embodiment of the present invention.

FIGS. 3A through 3D are schematic cross-sectional views showing a corresponding relationship between through-holes and a wire of the webbing retractor relating to the first embodiment of the present invention.

FIGS. 5A through 5F are schematic cross-sectional views showing a corresponding relationship between through-holes and a wire in a webbing retractor relating to a second embodiment of the present invention.

DESCRIPTION OF THE PREFERRED EMBODIMENTS

First Embodiment

Figure 2:
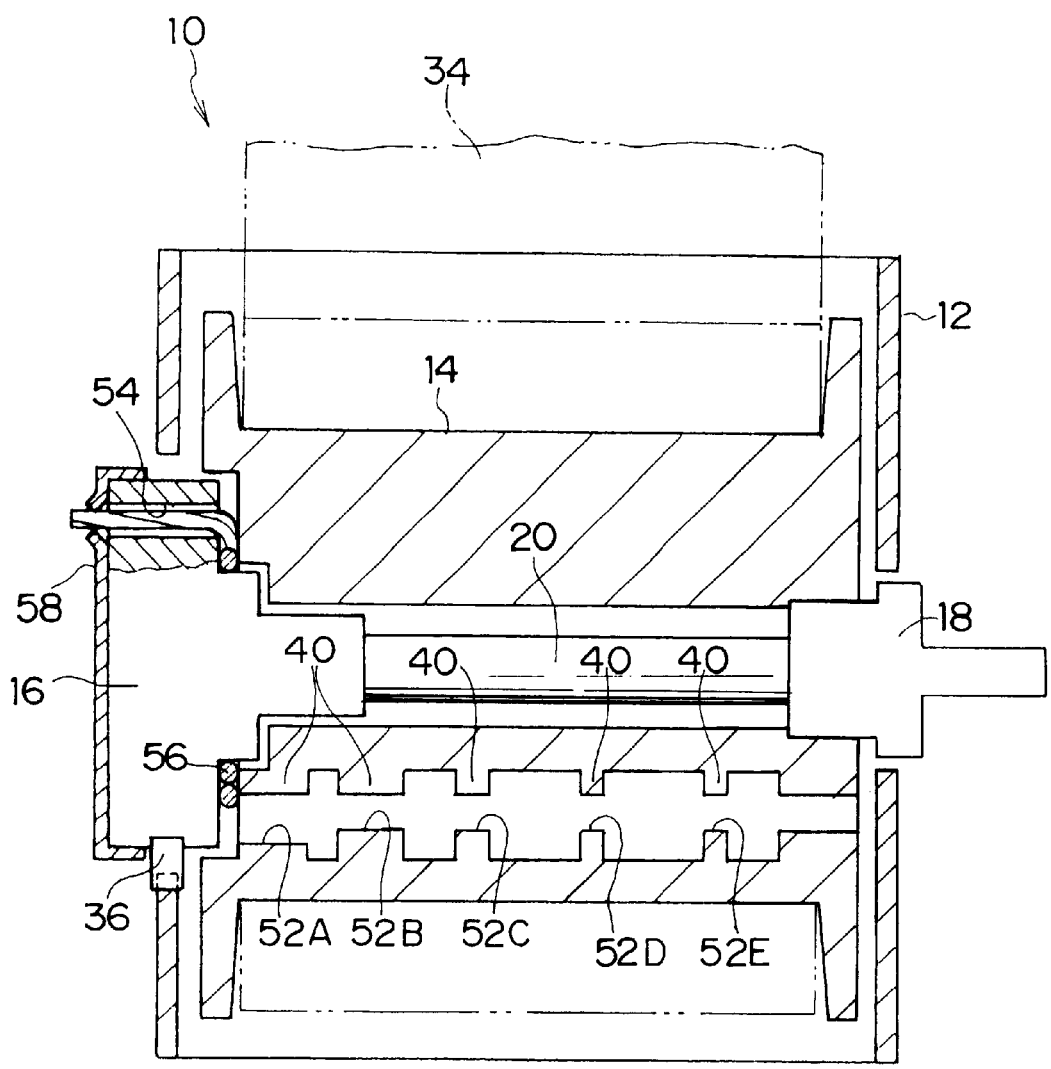
FIG. 2 is a cross-sectional view showing an energy absorbing state of the webbing retractor relating to the first embodiment of the present invention.

The structure of a webbing retractor 10 relating to a first embodiment is shown in FIGS. 1 and 2.

The webbing retractor 10 has a frame 12 which is substantially U-shaped. The frame 12 is formed by a pair of leg plates which oppose one another, and a back plate which connects the leg plates. The frame 12 is fixed to a vehicle body at the back plate portion of the frame 12.

A tubular spool 14, whose axial direction is the direction in which the leg plates oppose one another, is provided between the pair of opposing leg plates of the frame 12. One end of a webbing 34 is anchored on the spool 14. Due to the spool 14 rotating, the webbing 34 is freely taken-up onto or pulled-out from the spool 14.

A shaft sensor 16 is disposed within the spool 14 at one end portion thereof (the left end side portion in FIG. 1). The shaft sensor 16 is supported at an opening portion of the leg plate of the frame 12, so as to be freely rotatable and so as to be coaxial with the spool 14. A lock plate 36, which forms a lock device, is connected to the shaft sensor 16. When an acceleration sensor (not shown) senses a predetermined acceleration (deceleration), the lock plate 36 bites into the frame 12, thereby impeding rotation of the shaft sensor 16.

One end portion of a torsion bar 20, which is disposed at the axially central portion within the spool 14, is connected to the shaft sensor 16. The shaft sensor 16 usually rotates integrally with the one end portion of the torsion bar 20.

On the other hand, a sleeve 18 is disposed within the other end portion (the right side end portion in FIG. 1) of the spool 14. Due to the sleeve 18 being fit-together with splineshaped teeth (not shown), the sleeve 18 is connected integrally to the spool 14, and is supported at an opening portion of the leg plate of the frame 12 so as to be freely rotatable and coaxial with the spool 14. The distal end portion of the sleeve 18 projects outwardly from the leg plate, and a power spring (not shown) is provided at this projecting end portion of the sleeve 18. In this way, the sleeve 18 is usually urged to rotate in the direction of taking-up the webbing 34.

The sleeve 18 is connected to the shaft sensor 16 due to the other end portion of the torsion bar 20 being connected to the sleeve 18. In this way, usually, the spool 14, the sleeve 18, the torsion bar 20, and the shaft sensor 16 rotate integrally.

As shown in FIG. 3, a plurality of ribs 40 are provided at the interior of the spool 14. Through-holes 52A through 52E serving as load limiting devices are formed at the respective ribs 40. Among the through-holes 52A through 52E, the through-hole 52A, which is positioned at the side near the exit portion of the spool 14 (the shaft sensor 16 side) is formed to have a larger diameter than the diameters of the other through-holes 52B through 52E. Moreover, a hole 54 is formed in the shaft sensor 16 so as to oppose the through-hole 52A.

A wire 56 spans between the shaft sensor 16 and the spool 14. The wire 56 is movably inserted through the through-holes 52A through 52E of the spool 14. One end portion of the wire 56 (the left side end portion in FIG. 1) passes through the hole 54 of the shaft sensor 16, and thereafter, is anchored by a bush nut 58 provided at the shaft sensor 16, so as to be joined integrally to the shaft sensor 16.

Operation of the first embodiment will be described hereinafter.

In the webbing retractor 10 having the above-described structure, the spool 14 and the shaft sensor 16 are connected by the torsion bar 20. Usually, the spool 14, the shaft sensor 16, and the torsion bar 20 rotate integrally, and the webbing 34 can be pulled-out and taken-up freely.

Figure 4B:
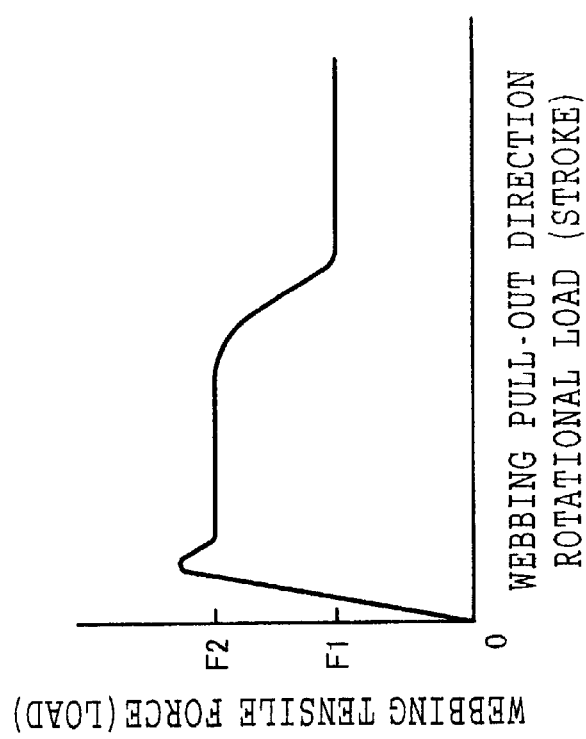
FIGS. 4A and 4B are graphs showing the relationship between webbing tensile force (force limiter load) and an amount of rotation in a webbing pull-out direction, in the webbing retractor relating to the first embodiment of the present invention.
Figure 4A:
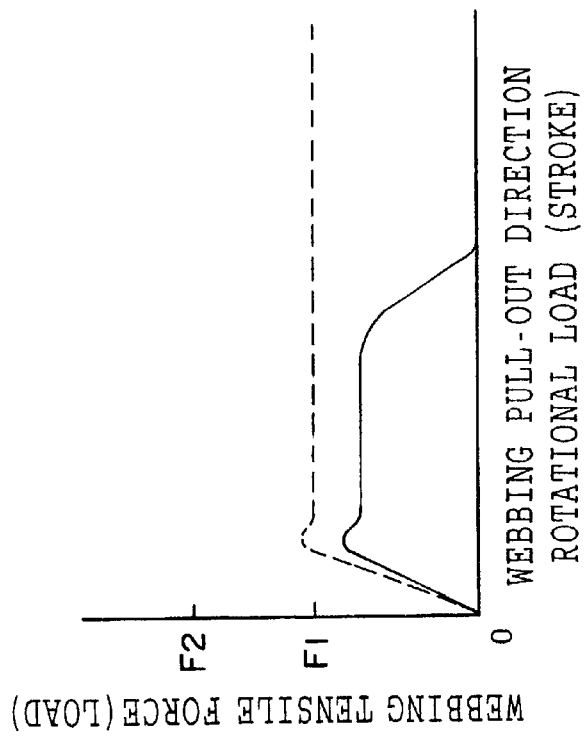

Here, when a predetermined acceleration (deceleration) is sensed when the vehicle rapidly decelerates at the time of a collision for example, the lock plate 36 bites into the frame 12, and rotation of the shaft sensor 16 in the webbing pull-out direction is impeded. At this time, the webbing tensile force is applied via the spool 14 to the torsion bar 20 as torque in the direction of pulling-out the webbing. Thus, the torsion bar 20 twists, and while the load applied to the webbing 34 (the vehicle occupant) is maintained constant (i.e., while a constant force limiter load is applied), the spool 14 is rotated in the webbing pull-out direction with respect to the shaft sensor 16, the webbing 34 is pulled-out, and energy is absorbed by the torsion bar 20. The webbing tensile force and the amount of rotation of the spool 14 at this time have the relationship shown by the broken line in FIG. 4A, and a force limiter load (F1 in FIG. 4A) is obtained by the twisting load of the torsion bar 20.

Further, when the torsion bar 20 twists and the spool 14 rotates relative to the shaft sensor 16, as shown in FIGS. 3A through 3D, as the spool 14 rotates, the wire 56 is rubbed at the exit portions of the through-hole 52A and the hole 54, and while the wire 56 is taken-up onto the side surface of the spool 14, the spool 14 rotates (FIG. 2). Accordingly, in addition to the twisting load of the torsion bar 20, the rubbing force of the wire 56 is applied to (the vehicle occupant via) the webbing 34 as force limiter load. The webbing tensile force and the amount of rotation of the spool 14 at this time have the relationship shown by the solid line in FIG. 4A, and a predetermined force limiter load is obtained by the rubbing force of the wire 56.

Namely, a large force limiter load can be obtained on the whole by the sum of the twisting load of the torsion bar 20 and the rubbing force of the wire 56. The webbing tensile force and the amount of rotation of the spool 14 at this time have the relationship shown in FIG. 4B. A force limiter load (F2 in FIG. 4B) which is greater than the force limiter load (F1 in FIG. 4B) obtained by only the twisting load of the torsion bar 20 can be obtained. Thus, the speed of pulling-out the webbing 34 (the rotational speed of the spool 14) can be kept low, and appropriate energy absorption can be achieved.

Moreover, when the spool 14 has rotated by a predetermined amount with respect to the shaft sensor 16, the entire length of the wire 56, which spans between the shaft sensor 16 and the spool 14, is completely pulled out from the through-hole 52A. Thus, the imparting of load due to the rubbing of the wire 56 is cancelled. Therefore, only the twisting load of the torsion bar 20 is applied to (the vehicle occupant via) the webbing 34 as force limiter load. Namely, the force limiter load decreases to a level (load F1 in FIG. 4B) lower than that of the initial force limiter load at the time when energy absorption starts.

In this way, in the webbing retractor 10 relating to the first embodiment, the force limiter load can be changed at a predetermined timing. Namely, in the initial stage of the rapid deceleration of the vehicle, load is added due to the rubbing of the wire 56 such that the amount of energy absorbed per unit time is large, and the pulled-out amount of the webbing 34 (or the amount of movement of the vehicle occupant) is kept low. After a predetermined energy absorption, by making the energy absorption amount per unit time small, the load applied to the vehicle occupant can be decreased. Therefore, a desirable characteristic can be obtained. In particular, in a vehicle equipped with an air bag device, by reducing the force limiter load immediately before the air bag and the vehicle occupant contact, the load applied to the vehicle occupant can be reduced, and injury to the vehicle occupant can be reduced even more. Further, even in a vehicle which is not equipped with an air bag device, by reducing the force limiter load immediately before contact of the vehicle occupant and an object within the vehicle such as the steering wheel, the instrument panel (the dashboard), or the like, the load applied to the vehicle occupant can be reduced, and injury to the vehicle occupant can be reduced.

Here, the webbing retractor 10 relating to the first embodiment is provided with the load limiting device which, at the time when pulling-out of the entire wire 56 from the through-holes 52A through 52E of the spool 14 is being completed while the wire 56 is being rubbed, limits the rubbing force at the time of completion of pulling-out so as to not exceed the rubbing force there before. Namely, the through-hole 52A positioned at the exit portion side (the shaft sensor 16 side) of the spool is formed to have a greater diameter than the diameters of the other through-holes 52B through 52E. Thus, when the pulling-out, from the through-hole 52A, of the distal end portion of the wire 56, which is bent while being rubbed at the through-hole 52A (the peripheral portion thereof), is being completed, as shown in FIGS. 3A through 3D, the radius of curvature of the bent distal end portion increases (due to the distal end portion reaching the through-hole 52A). Accordingly, the rubbing force which is imparted by the rubbing of the wire 56 does not suddenly increase at the time when the pulling-out of the wire 56 from the spool 14 (the through-hole 52A) is completed. Namely, no large pull-out load of the wire 56 arises. Accordingly, the force limiter load can be smoothly changed from a large value in the initial stages to a small value at the latter stages. In other words, the state changes from a state in which the energy absorption amount per unit time is large to a state in which the energy absorption amount per unit time is small.

As described above, in the webbing retractor 10 relating to the first embodiment, with a simple structure, the force limiter load can be changed at a predetermined timing, and the inertial energy of the vehicle occupant can be absorbed better.

In the webbing retractor 10 relating to the above-described first embodiment, the load limiting device which, when the pulling-out of the entire wire 56 from the through-holes 52A through 52E of the spool 14 is being completed while the wire 56 is being rubbed, limits the rubbing force at the time that the pulling-out is being completed so as to not exceed the rubbing force therebefore, is structured such that the through-hole 52A which is positioned at the exit portion side of the spool 14 (the shaft sensor 16 side) has a larger diameter than the diameters of the other through-holes 52B through 52E. However, the load limiting device of the present invention is not limited to the same, and can be realized by another structure.

For example, the distal end (final end) portion of the wire 56 can gradually become more narrow in a tapering manner, such that a taper portion is provided at this distal end. Or, the distal end (final end) portion of the wire 56 may be subjected to a heat treatment so as to form a heat-treated portion whose rubbing force characteristic is different from that of the other regions of the wire 56.

In accordance with these structures as well, the rubbing force imparted by the rubbing of the wire 56 does not increase suddenly at the time when the pulling-out of the entire wire 56 from the interior of the spool 14 (the through-hole 52A) is completed. Namely, a large pull-out load of the wire 56 does not arise. Accordingly, the force limiter load can be smoothly changed from a large value in the initial stages to a small value in the latter stages.

Moreover, in accordance with the above-described structure, immediately before the completion of the pulling-out of the wire 56 from the through-holes 52A through 52E of the spool 14, the rubbing force of the wire 56 is gradually reduced.

Here, for example, in a vehicle equipped with an air bag device, by reducing the force limiter load immediately before the air bag and the vehicle occupant contact, the load applied to the vehicle occupant can be reduced, and injury to the vehicle occupant can be further reduced. If the canceling of the imparting of load due to the rubbing of the wire 56 as described above occurs instantaneously, there is the possibility that, due to errors in assembly or the like, the air bag may deploy before the force limiter load is reduced.

Thus, when a taper portion or a heat-treated portion is provided at the distal end portion of the wire 56 as described above, no large pull-out load of the wire 56 arises. Further, the load imparted by the rubbing of the wire 56 gradually decreases immediately before the completion of the pulling-out of the wire 56 from the through-hole 52A of the spool 14. Thus, even if, due to assembly errors or the like, the air bag deploys before the imparting of load due to the rubbing of the wire 56 is completely cancelled, the force limiter load becomes at least smaller than F2 in FIG. 4B. The load applied to the vehicle occupant decreases, and injury to the vehicle occupant can be reduced even more reliably.

Next, another embodiment of the present invention will be described. Parts which are basically the same as those of the first embodiment are denoted by the same reference numerals as in the first embodiment, and description thereof is omitted.

Second Embodiment

FIG. 5 is a schematic cross-sectional view showing the structure of main portions of a webbing retractor 60 relating to the second embodiment.

The webbing retractor 60 has basically the same structure as that of the webbing retractor 10 relating to the above-described first embodiment. However, in the webbing retractor 60, through-holes 62A through 62E, which serve not only as a force limiting device but also as a delaying device, are formed at the plurality of ribs 40 within the spool 14. Among the through-holes 62A through 62E, the through-holes 62A and 62B, which are positioned at the exit portion side (the shaft sensor 16 side) of the spool 14, are formed to have diameters which are larger than those of the other through-holes 62C and 62D, and which gradually increase toward the inner side of the curvature of the rubbing of the wire 56.

The other structures are the same as those of the webbing retractor 10 relating to the above-described first embodiment. The wire 56 is movably inserted in the through-holes 62A through 62E.

Next, operation of the second embodiment will be described.

Figure 6A:
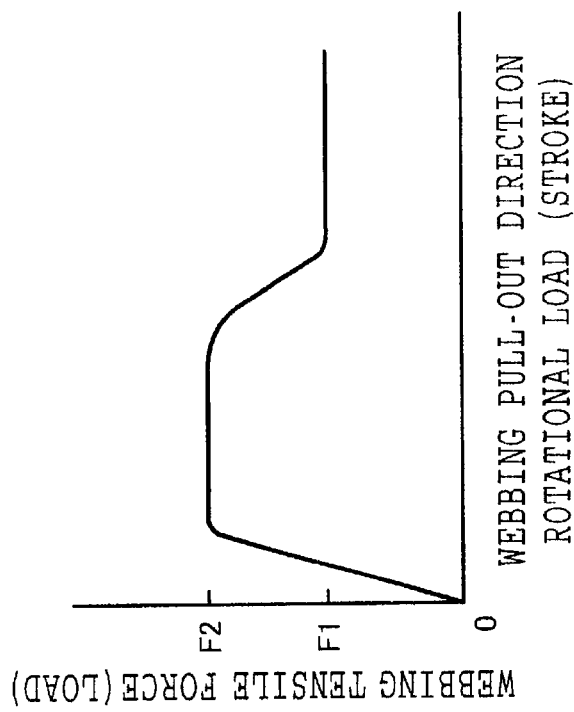
FIGS. 6A and 6B are graphs showing the relationship between webbing tensile force (force limiter load) and an amount of rotation in a webbing pull-out direction, in the webbing retractor relating to the second embodiment of the present invention.

In the webbing retractor 60 having the above-described structure, in the same way as in the previously-described webbing retractor 10, when rotation of the shaft sensor 16 in the webbing pull-out direction is impeded, the torsion bar 20 twists, and while the load applied to (the vehicle occupant via) the webbing 34 is maintained constant (i.e., while a constant force limiter load is applied), the spool 14 is rotated in the webbing pull-out direction with respect to the shaft sensor 16, the webbing 34 is pulled-out, and energy is absorbed by the torsion bar 20. The webbing tensile force and the amount of rotation of the spool 14 at this time have the relationship shown by the broken line in FIG. 6A, and a force limiter load (F1 in FIG. 6A) is obtained by the twisting load of the torsion bar 20.

Further, when the torsion bar 20 is twisted and the spool 14 rotates relative to the shaft sensor 16, as shown in FIGS. 5A through 5E, as the spool 14 rotates, the wire 56 is rubbed at the exit portions of the through-hole 62A and the hole 54, and while the wire 56 is taken-up onto the side surface of the spool 14, the spool 14 rotates. Accordingly, in addition to the twisting load of the torsion bar 20, the rubbing force of the wire 56 is applied to (the vehicle occupant via) the webbing 34 as force limiter load. The webbing tensile force and the amount of rotation of the spool 14 at this time have the relationship shown by the solid line in FIG. 6A, and a predetermined force limiter load is obtained by the rubbing force of the wire 56.

Figure 6B:
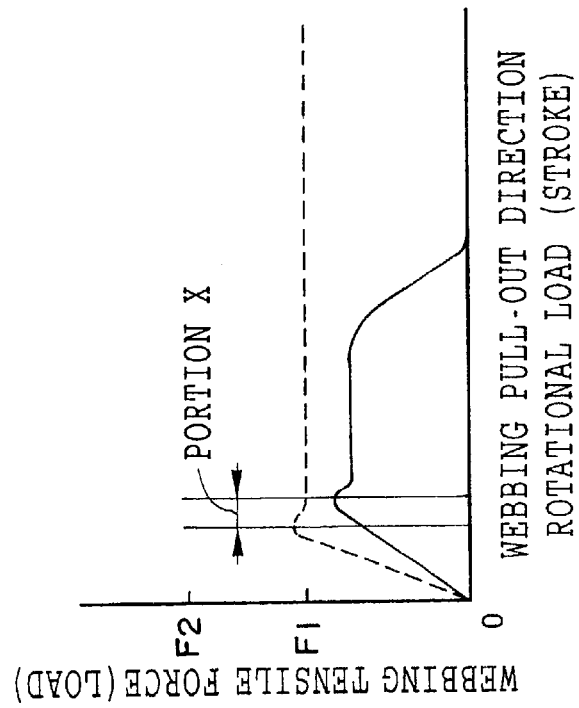

Namely, a large force limiter load can be obtained on the whole by the sum of the twisting load of the torsion bar 20 and the rubbing force of the wire 56. The webbing tensile force and the amount of rotation of the spool 14 at this time have the relationship shown in FIG. 6B. A force limiter load (F2 in FIG. 6B) which is greater than the force limiter load (F1 in FIG. 6B) obtained by only the twisting load of the torsion bar 20 can be obtained. Thus, the speed of pulling-out the webbing 34 (the rotational speed of the spool 14) can be kept low, and appropriate energy absorption can be achieved.

Moreover, when the spool 14 has rotated by a predetermined amount with respect to the shaft sensor 16, the entire length of the wire 56, which spans between the shaft sensor 16 and the spool 14, is completely pulled out from the through-hole 62A of the spool 14. Thus, the imparting of load due to the rubbing of the wire 56 is cancelled. Therefore, only the twisting load of the torsion bar 20 is applied to (the vehicle occupant via) the webbing 34 as force limiter load. Namely, the force limiter load decreases to a level (load F1 in FIG. 6B) lower than that of the initial force limiter load at the time when energy absorption starts.

In this way, in the webbing retractor 60 relating to the second embodiment, the force limiter load can be changed at a predetermined timing.

Here, the webbing retractor 60 relating to the second embodiment is provided with the load limiting device which, at the time when pulling-out of the entire wire 56 from the through-holes 62A through 62E of the spool 14 is being completed while the wire 56 is being rubbed, limits the rubbing force at the time of completion of pulling-out to not exceed the rubbing force therebefore. Namely, the through-holes 62A and 62B positioned at the exit portion side (the shaft sensor 16 side) of the spool 14 are formed to have diameters which are larger than the diameters of the other through-holes 62C through 62E, and which increase toward the inner side of the curvature of the rubbing of the wire 56. Thus, when the pulling-out, from the through-hole 62A, of the distal end portion of the wire 56, which is bent while being rubbed against the peripheral portion of the through-hole 62A, is being completed, as shown in FIGS. 5A through 5E, the radius of curvature of the bent distal end portion increases (due to the distal end portion reaching the through-holes 62A and 62B). Accordingly, the rubbing force which is imparted by the rubbing of the wire 56 does not suddenly increase at the time when the pulling-out of the wire 56 from the spool 14 (the through-hole 62A) is completed. Namely, no large pull-out load of the wire 56 arises. Accordingly, the force limiter load can be smoothly changed from a large value at the initial stages of the webbing pull-out control process, to a small value at the latter stages. In other words, the state changes from a state in which the energy absorption amount per unit time is large to a state in which the energy absorption amount per unit time is small.

Moreover, here, in the webbing retractor 60, the through-holes 62A and 62B positioned at the exit portion side (the shaft sensor 16 side) of the spool 14 are formed such that their diameters are greater than the diameters of the other through-holes 62C through 62E, and increase toward the inner side of the curvature of the rubbing of the wire 56. The through-holes 62A and 62B not only function as a force limiter device, but also function as a delaying device.

Namely, the wire 56 is inserted through the plurality of through-holes 62A through 62E, and pulling-out of the wire 56 from the spool 14 is completed while the wire 56 is being rubbed by (the peripheral portion of) the through-hole 62A positioned at the exit portion side of the spool 14. Here, the through-holes 62A and 62B, which are positioned at the exit portion side of the spool 14, are formed to have diameters which are larger than the diameters of the other through-holes 62C through 62E and which increase gradually toward the inner side of the curvature of the rubbing of the wire 56. Thus, at the point in time when the wire 56 is first rubbed (tensed) by the through-hole 62A (the peripheral portion thereof), hardly any rubbing force arises at the portion where the through-holes 62A and 62B are formed to have enlarged diameters (during the time until the wire 56 reaches the peripheral portion of the through-hole 62A) (during the time from FIG. 5A to FIG. 5B). Namely, at the point in time when the wire 56 is initially rubbed (tensed), the wire 56 moves through the enlarged diameter portions of the through-holes 62A and 62B, and thereafter, rubbing force first arises when the wire 56 reaches the peripheral portions of the through-holes 62A and 62B. In this way, the peak of the imparted load at the time when imparting of the rubbing force by the wire 56 is started, is offset in time from the peak of the twisting load at the time when the torsion bar 20 is twisted. Namely, the peak of the rubbing force imparted by the wire 56 and the peak of the twisting load imparted by the torsion bar 20 are offset from one another. The peak of the twisting load due to the torsion bar and the peak of the rubbing force due to the wire do not overlap one another at a same time.

Accordingly, when the torsion bar 20 is twisted (the force limiter load is applied) and the spool 14 begins to be rotated in the webbing pull-out direction with respect to the shaft sensor 16, the force limiter load (the twisting load due to the torsion bar 20 and the rubbing force due to the wire 56) does not increase suddenly. Namely, a large peak load does not arise. Accordingly, it is possible to make the force limiter load smoothly rise to a predetermined value, and to apply the force limiter load.

As described above, in the webbing retractor 60 relating to the second embodiment, with a simple structure, the force limiter load can be changed at a predetermined timing. Accordingly, the inertial energy of the vehicle occupant can be absorbed better.

Comparison of the Embodiments with a Conventional Example

The force limiter load characteristics of the webbing retractor 10 relating to the first embodiment and the webbing retractor 60 relating to the second embodiment are hereinafter compared with that of a conventional webbing retractor.

Figure 9A:
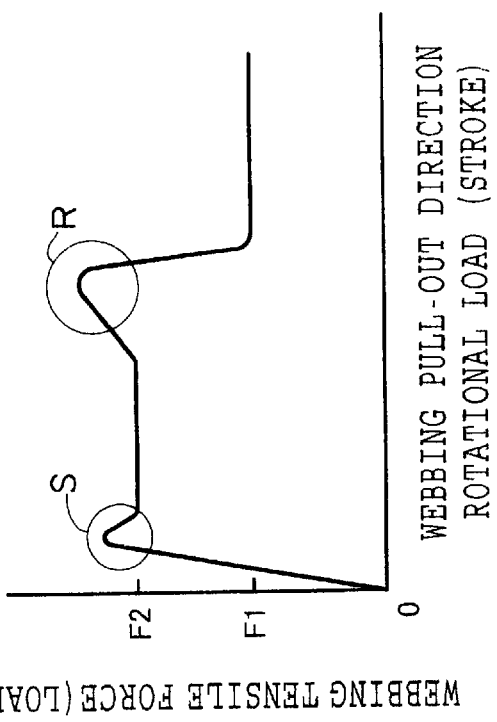
FIGS. 9A and 9B are graphs showing the relationship between webbing tensile force (force limiter load) and an amount of rotation in a webbing pull-out direction, in the webbing retractor relating to the conventional example.
Figure 9B:
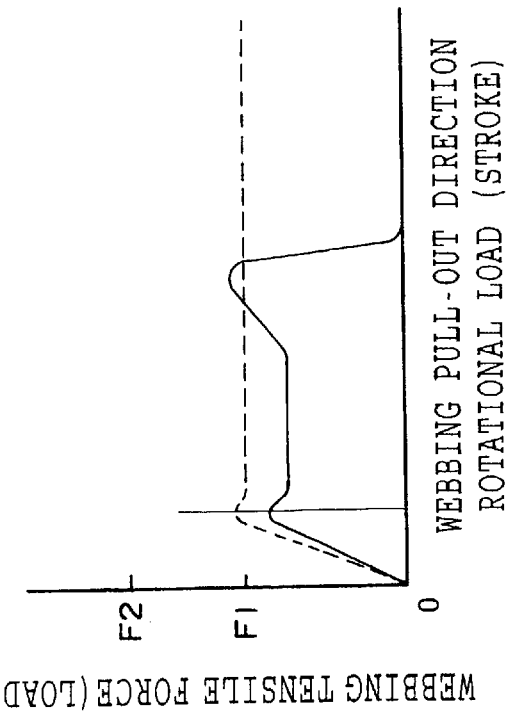

In the force limiter load characteristic of a conventional webbing retractor, as shown by the broken line in FIG. 9A, energy absorption is achieved by a torsion bar. Further, as shown by the solid line in FIG. 9A, a predetermined force limiter load is obtained by rubbing force of a wire as well. On the whole, the force limiter load characteristic is as shown in FIG. 9B.

In this case, when the pulling-out of the wire from the spool (the through-hole) is completed, the load suddenly increases. Namely, a large pull-out load of the wire arises. Accordingly, it is not possible to smoothly change the force limiter load from a high value at the initial stages to a low value at the latter stages (to change from a state in which the energy absorption amount per unit time is large to a state in which the energy absorption amount per unit time is small) (portion R in FIG. 9B).

Moreover, as shown in FIG. 9A, the peak of the imparted load at the time when imparting of the rubbing force by the wire starts coincides, in time, with the peak of the twisting load at the time when the torsion bar is twisted. Namely, a peak of the twisting load due to the torsion bar and a peak of the rubbing force due to the wire, which overlap at the same time, arise. Accordingly, at the time when the torsion bar is twisted (the force limiter load is applied) and the spool begins to be rotated in the webbing pull-out direction with respect to the shaft sensor, the force limiter load (the twisting load due to the torsion bar and the rubbing force due to the wire) suddenly increases. Namely, a large peak load arises. As a result, it is not possible to make the force limiter load smoothly rise to a predetermined value and to apply the force limiter load (portion S in FIG. 9B).

In contrast, the webbing retractor relating to the first embodiment and the webbing retractor 60 relating to the second embodiment overcome the above-described problems of the conventional webbing retractor.

Figure 7:
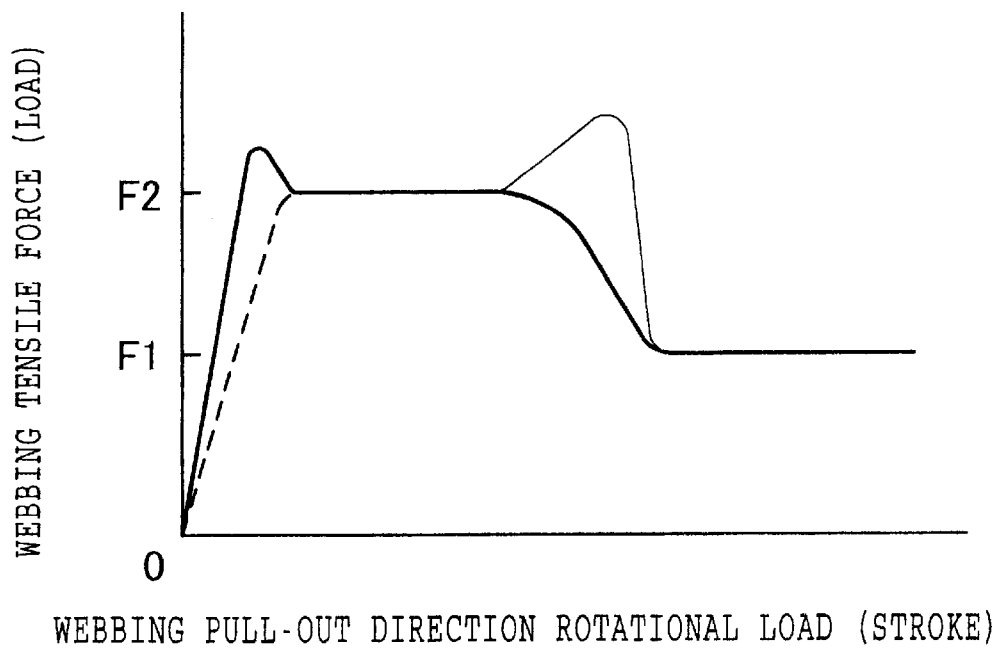
FIG. 7 is a graph showing, in comparison with a conventional example, the relationship between webbing tensile force (force limiter load) and an amount of rotation in a webbing pull-out direction, in the webbing retractors relating to the first and second embodiments of the present invention.
Figure 8A:
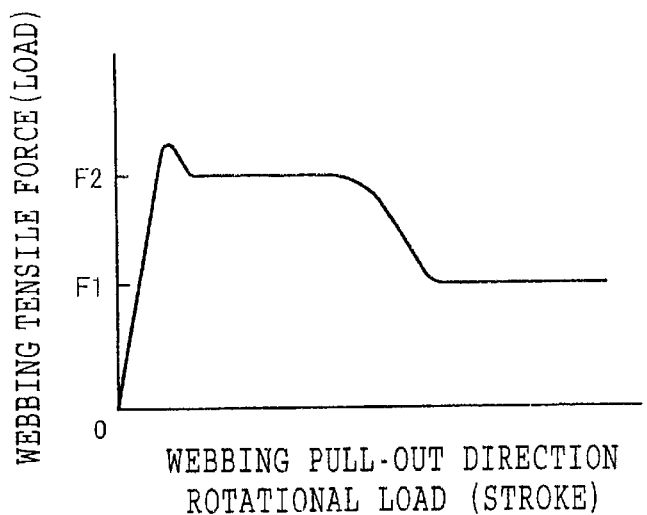
FIG. 8A is a graph showing the relationship between webbing tensile force (force limiter load) and an amount of rotation in a webbing pull-out direction, in the webbing retractor relating to the first embodiment of the present invention.
Figure 8B:
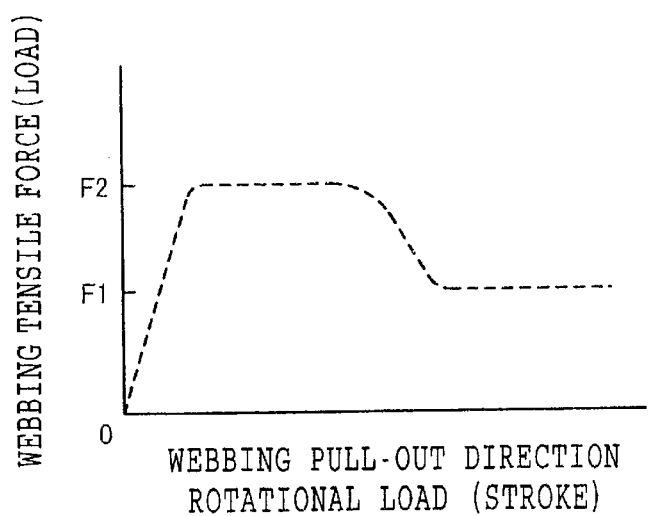
FIG. 8B is a graph showing the relationship between webbing tensile force (force limiter load) and an amount of rotation in a webbing pull-out direction, in the webbing retractor relating to the second embodiment of the present invention.
Figure 8C:
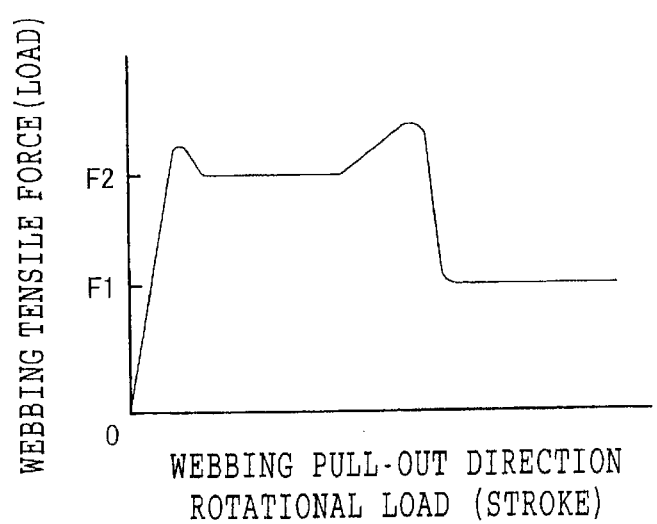
FIG. 8C is a graph showing the relationship between webbing tensile force (force limiter load) and an amount of rotation in a webbing pull-out direction, in a webbing retractor relating to a conventional example.

Here, FIG. 8A shows the force limiter load characteristic (the relationship between the webbing tensile force and the amount of rotation of the spool 14) of the webbing retractor relating to the first embodiment. FIG. 8B shows the force limiter load characteristic of the webbing retractor 60 relating to the second embodiment. FIG. 8C shows the force limiter load characteristic of the conventional webbing retractor. Moreover, FIG. 7 is a graph in which the characteristics of the respective webbing retractors shown in FIGS. 8A through 8C are superposed on a single graph.

As is clear from these drawings, in the webbing retractor 10 relating to the first embodiment and the webbing retractor 60 relating to the second embodiment, there is no sudden increase at the time of completion of the pulling-out of the entire wire 56 from the spool 14 (the through-holes 52A through 52E, or the through-holes 62A through 62E). Namely, no great pull-out load of the wire arises. Accordingly, the force limiter load can smoothly change from a large value at the initial stages to a small value at the latter stages (i.e., it is possible to smoothly change from a state in which the energy absorption amount per unit time is large to a state in which the energy absorption amount per unit time is small). Moreover, in the webbing retractor 60 relating to the second embodiment, the peak of the imparted load at the time when the imparting of rubbing force due to the wire 56 is started, is offset, in time, from the peak of the twisting load at the time the torsion bar 20 is twisted. When the torsion bar 20 is twisted (the force limiter load is applied) and the spool 14 begins to be rotated in the webbing pull-out direction with respect to the shaft sensor 16, the force limiter load (the twisting load due to the torsion bar 20 and the rubbing force due to the wire 56) does not suddenly increase. Namely, no large peak load arises. Accordingly, the force limiter load can be made to smoothly rise to a predetermined value, and can be applied.

As described above, in the webbing retractor relating to the present invention, with a simple structure, a force limiter load can be changed at a predetermined timing. Further, the webbing retractor of the present invention has the excellent effect that it can better absorb inertial energy of a vehicle occupant.

What is claimed is:

1. A webbing retractor comprising:

a spool which is tubular and onto which a webbing is taken-up and from which a webbing is pulled-out;

a shaft sensor provided at one end side of the spool, coaxially with the spool and so as to be able to rotate relative to the spool;

a lock device connected to the shaft sensor, and when a predetermined acceleration is sensed, the lock device engages with a frame so as to impede rotation of the shaft sensor in a webbing pull-out direction;

a first energy absorbing means including a torsion bar provided within the spool and coaxially with the spool, and one end of the torsion bar is connected to one end of the spool and an opposing end of the torsion bar is connected to the shaft sensor, and the torsion bar is usually rotated integrally with the shaft sensor, and in a state in which rotation of the shaft sensor in the webbing pull-out direction is impeded by the lock device, the torsion bar rotates the spool in the webbing pull-out direction relative to the shaft sensor, while being twisted due to a webbing tensile force to absorb energy as said webbing is pulled out; and a second energy absorbing means including a wire spanning between the shaft sensor and the spool and inserted movably within the spool, and in the state in which rotation of the shaft sensor in the webbing pull-out direction is impeded by the lock device, as the spool rotates until relative rotation of the spool with respect to the shaft sensor has reached a predetermined amount, the wire is rubbed at an exit portion of the spool and imparts a rubbing force which offers resistance to the relative rotation, wherein the webbing retractor includes a force limiting device which, when pulling-out of the wire from the spool is being completed while the wire is being rubbed, limits the rubbing force at the time the pulling-out of the wire is being completed such that the rubbing force does not exceed a rubbing force imparted therebefore.

2. The webbing retractor of claim 1, wherein the force limiting device includes a through-hole which is provided in the spool and in which the wire is movably inserted, the through-hole being formed such that a spool exit portion side of the through-hole has an enlarged diameter.

3. The webbing retractor of claim 1, wherein the force limiting device includes a taper portion provided at a wire distal end portion and formed so as to taper gradually.

4. The webbing retractor of claim 1, wherein the force limiting device includes a heat-treated portion provided at a wire distal end portion, the heat-treated portion having a different rubbing force characteristic than other portions of the wire due to the heat-treated portion having been subjected to a heat treatment.

5. The webbing retractor of claim 1, further comprising a delaying means for offsetting, in time, a peak of an imparted load at a time when imparting of the rubbing force by the wire starts, with respect to a peak of a twisting load at a time when the torsion bar is twisted.

6. The webbing retractor of claim 2, further comprising a delaying means for offsetting, in time, a peak of an imparted load at a time when imparting of the rubbing force by the wire starts, with respect to a peak of a twisting load at a time when the torsion bar is twisted.

7. The webbing retractor of claim 3, further comprising a delaying means for offsetting, in time, a peak of an imparted load at a time when Imparting of the rubbing force by the wire starts, with respect to a peak of a twisting load at a time when the torsion bar is twisted.

8. The webbing retractor of claim 4, further comprising a delaying means for offsetting, in time, a peak of an imparted load at a time when imparting of the rubbing force by the wire starts, with respect to a peak of a twisting load at a time when the torsion bar is twisted.

9. The webbing retractor of claim 5, wherein the delaying means includes a through-hole provided in the spool and in which the wire is movably inserted, the through-hole being formed such that a diameter of a spool exit portion side of the through-hole increases at least toward an inner side of curvature of rubbing of the wire.

10. The webbing retractor according to claim 6, wherein the force limiting device includes the delaying device.

11. The webbing retractor according to claim 7, wherein the force limiting device includes the delaying device.

12. The webbing retractor according to claim 8, wherein the force limiting device includes the delaying device.

13. A method of retracting a webbing in a webbing retractor of a vehicle at a time of rapid deceleration of the vehicle, the method comprising the steps of:

(a) sensing an acceleration at the time of rapid deceleration of the vehicle, and applying a webbing tensile force, which arises when rotation in a direction of pulling-out a webbing which is able to be taken-up onto and pulled-out from a tubular spool is impeded, as webbing pull-out direction torque of a torsion bar which is coaxial with the spool and has one end connected to a shaft sensor at one end of the spool and an opposing end connected to an opposite end of the spool;

(b) applying twisting load of the torsion bar due to the torsion bar being twisted, to the webbing, and pulling-out the webbing by the spool being rotated in the webbing pull-out direction while load applied to the webbing is maintained constant;

(c) rotating the spool such that, when the torsion bar is being twisted, a wire, which spans between the spool and a shaft sensor which is connected to one end to the shaft sensor and is coaxial with and rotatable relative to the spool, is, as the spool rotates, bent and rubbed at a peripheral portion of a hole provided in the spool, and is taken-up onto the spool, and applying a rubbing force of the wire to the webbing; and (d) canceling application of the rubbing force of the wire to the webbing, when the spool rotates a predetermined amount with respect to the shaft sensor and an entire length of the wire is completely pulled out from the hole of the spool.

14. The method of claim 13, further comprising the step of suppressing a sudden change in the rubbing force generated between the wire and the peripheral portion of the hole, by making an amount of curvature of the wire decrease as pulling-out of the wire nears completion of pulling-out of the entire length of the wire.

15. The method of claim 13, further comprising the step of suppressing a sudden change in load applied to the webbing, by decreasing the rubbing force of the wire generated by the wire and the peripheral portion of the hole as pulling-out of the wire nears completion of pulling-out of the entire length of the wire, when the wire is being pulled-out from the hole of the spool.

16. The method of claim 13, wherein in the step of applying the rubbing force of the wire to the webbing, a time of a peak of the twisting load of the torsion bar and a time of a peak of the rubbing force of the wire are offset from one another.

17. The method of claim 16, further comprising the step of suppressing a sudden change in the rubbing force generated between the wire and the hole, by making an amount of curvature of the wire decrease as pulling-out of the wire nears completion of pulling-out of the entire length of the wire.

18. The method of claim 16, further comprising the step of suppressing a sudden change in load applied to the webbing, by decreasing the rubbing force of the wire generated by the wire and the peripheral portion of the hole as pulling-out of the wire nears completion of pulling-out of the entire length of the wire, when the wire is being pulled-out from the hole of the spool.

* * * * *